United States Patent
Jiang et al.

(10) Patent No.: US 8,965,141 B2
(45) Date of Patent: Feb. 24, 2015

(54) IMAGE FILTERING BASED ON STRUCTURAL INFORMATION

(71) Applicant: Thomson Licensing, Issy de Moulineaux (FR)

(72) Inventors: Wen Fei Jiang, Beijing (CN); Fan Zhang, Hubei (CN); Zhi Bo Chen, Beijing (CN)

(73) Assignee: Thomson Licensing, Issy les moulineaux (FR)

(*) Notice: Subject to any disclaimer, the term of this patent is extended or adjusted under 35 U.S.C. 154(b) by 208 days.

(21) Appl. No.: 13/721,551

(22) Filed: Dec. 20, 2012

(65) Prior Publication Data

US 2014/0050417 A1 Feb. 20, 2014

(51) Int. Cl.
*G06K 9/40* (2006.01)
*G06T 5/00* (2006.01)

(52) U.S. Cl.
CPC . *G06K 9/40* (2013.01); *G06T 5/002* (2013.01); *G06T 2207/20028* (2013.01); *G06T 2207/20192* (2013.01)
USPC .......................................................... 382/261

(58) Field of Classification Search
CPC .... G06K 9/4671; G06T 3/0012; G06T 3/403; G06T 5/002; G06T 5/20; G06T 11/008; G06T 11/203; G06T 2207/10024; G06T 2207/20028; G06T 2207/20192; G09G 5/20; H04N 7/0142
See application file for complete search history.

(56) References Cited

U.S. PATENT DOCUMENTS

| | | | |
|---|---|---|---|
| 6,329,977 B1 | 12/2001 | McNamara et al. | |
| 8,160,380 B2 | 4/2012 | Das Gupta et al. | |
| 8,285,033 B2 * | 10/2012 | Das Gupta et al. | 382/162 |
| 8,494,302 B2 * | 7/2013 | Ding et al. | 382/260 |
| 2011/0075026 A1 | 3/2011 | Wallace et al. | |

FOREIGN PATENT DOCUMENTS

| | | |
|---|---|---|
| KR | 866187 | 10/2008 |
| WO | WO2004036487 | 4/2004 |

OTHER PUBLICATIONS

Yoon et al., "Locally Adaptive Support-Weight Approach for Visual Correspondence Search", in proceedings of Conf. on Computer Vision and Pattern Recognition, p. 924-931, 2005.
Raman et al., "Bilateral Filter Based Compositing for Variable Exposure Photography", Eurographics 2009, pp. 1-4.
(Continued)

*Primary Examiner* — Jose Couso
(74) *Attorney, Agent, or Firm* — Robert D. Shedd; Jeffrey M. Navon

(57) ABSTRACT

A method and an apparatus for image filtering are described. Structural information is employed during the calculation of filtering coefficients. The structural information is described by the regions defined through an edge map of the image. In one embodiment, the region correlation between the target pixel and a contributing pixel is selected as a structural filtering coefficient. The region correlation, which indicates the possibility of two pixels being in the same regions, is calculated by evaluating the strongest edge cut by a path between the target pixel and a contributing pixel. The structural filtering coefficient is further combined with spatial information and intensity information to form a spatial-intensity-region (SIR) filter. The structural information based filter is applicable to applications such as denoising, tone mapping, and exposure fusion.

20 Claims, 7 Drawing Sheets

(56) References Cited

OTHER PUBLICATIONS

Mertens et al., "Exposure Fusion", in proceedings of Pacific Graphics, pp. 15-22, 2007.

Hosni et al., "Local Stereo Matching Using Geodesic Support Weights", in ICIP, 2009.

Tomasi et al., "Bilateral Filtering for Gray and Color Images", Proceedings of the 1998 IEEE International Conference on Computer Vision, Bombay, India, pp. 1-8.

Kundu, "Enhancement of JPEG Coded Images by Adaptive Spatial Filtering", 1995 IEEE, ICIP, pp. 187-190.

* cited by examiner

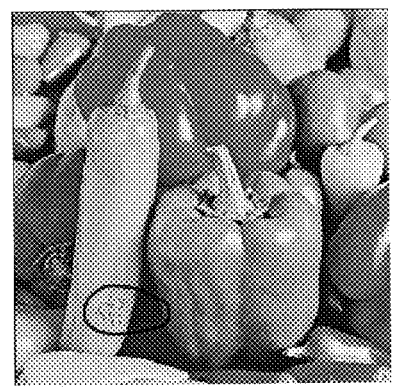
FIG. 1
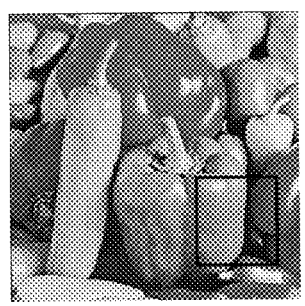 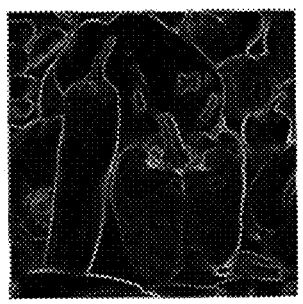 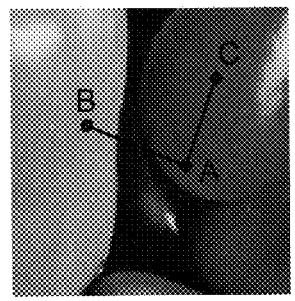
FIG. 2(A)  FIG. 2(B)  FIG. 2(C)
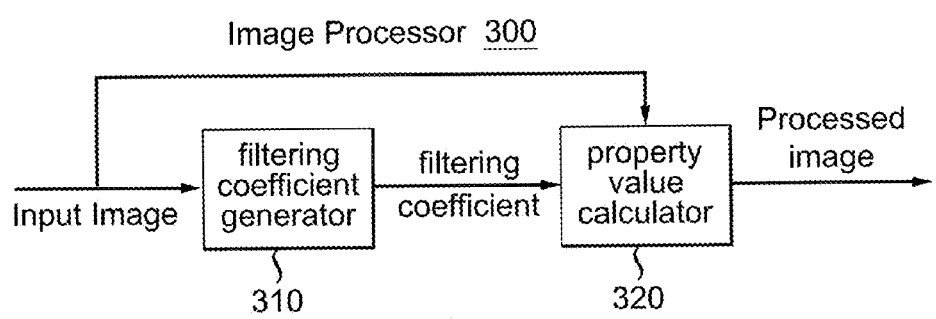
FIG. 3

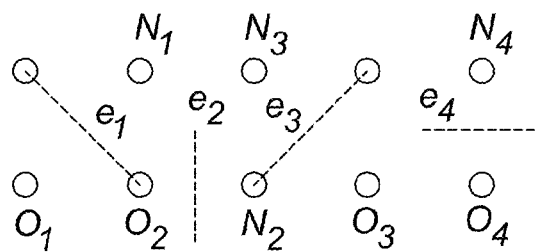
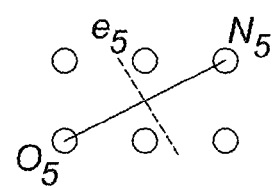
FIG. 7(A)  FIG. 7(B)
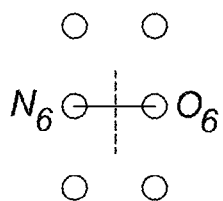
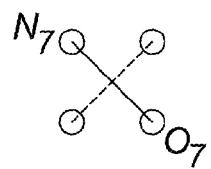
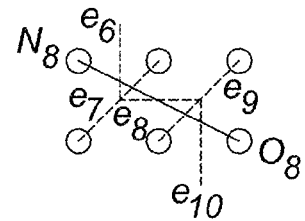
FIG. 8(A)  FIG. 8(B)  FIG. 8(C)
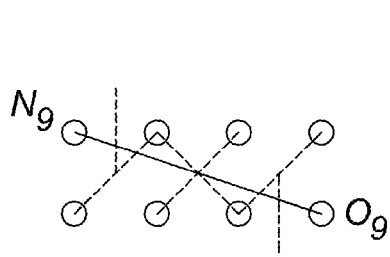
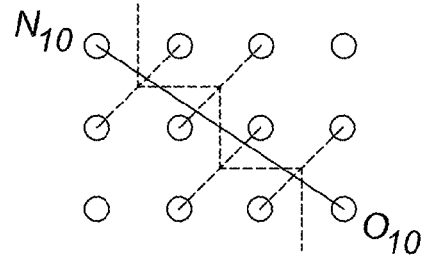
FIG. 8(D)  FIG. 8(E)
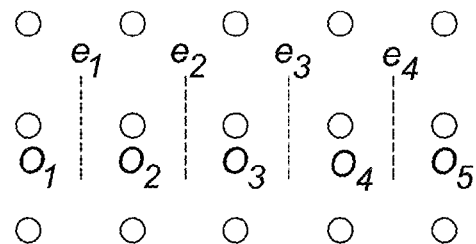
FIG. 9

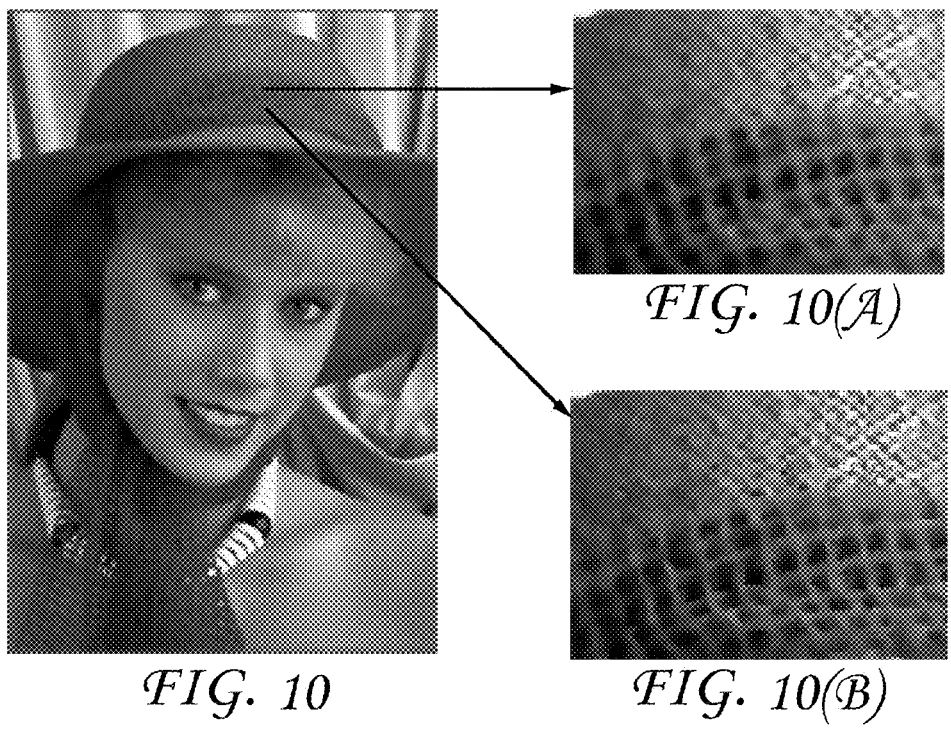
FIG. 10
FIG. 10(A)
FIG. 10(B)
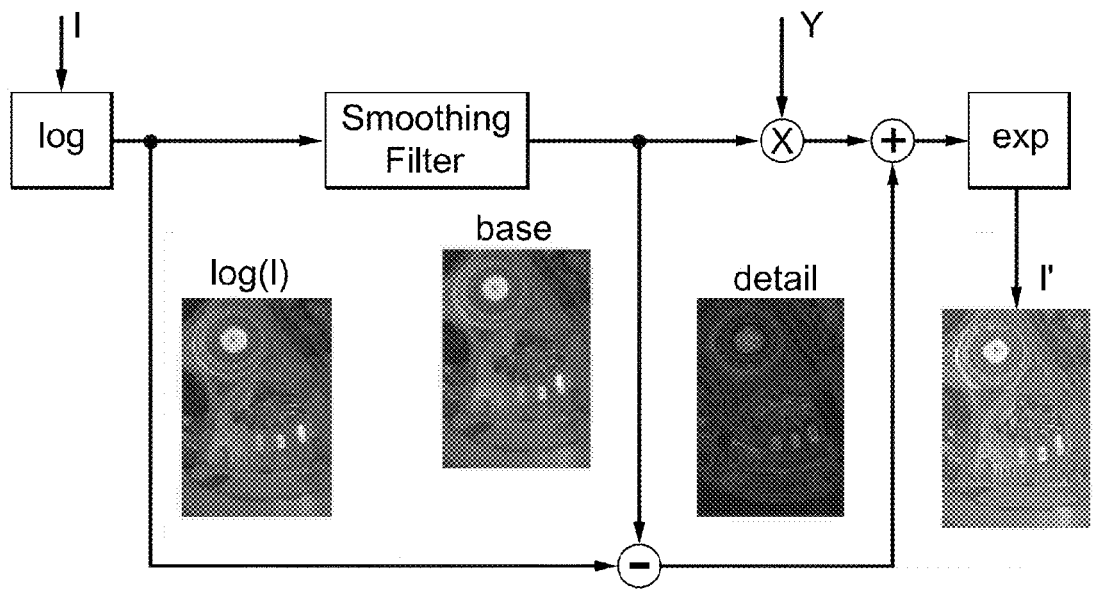
FIG. 11

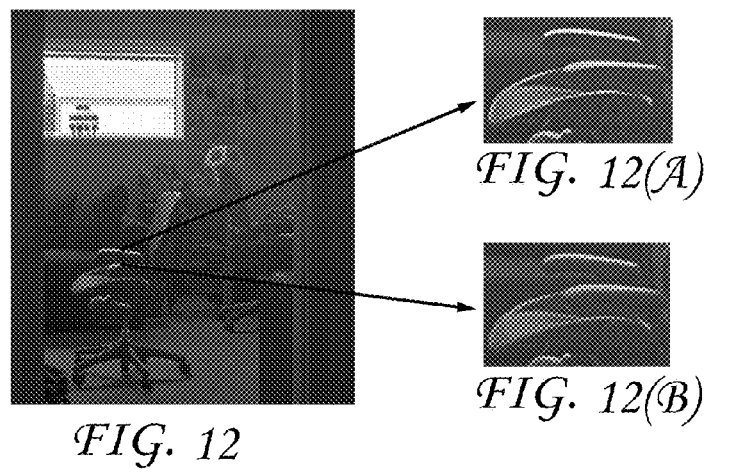
FIG. 12(A)
FIG. 12(B)
FIG. 12
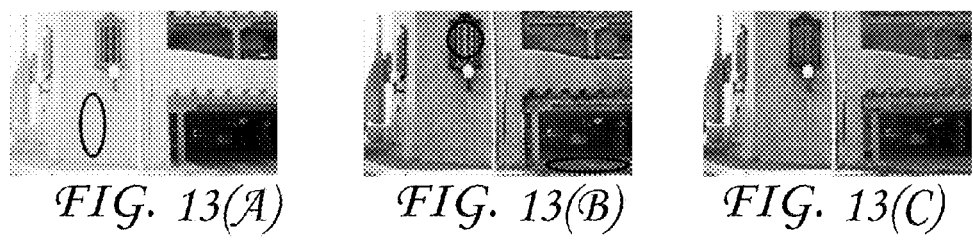
FIG. 13(A)   FIG. 13(B)   FIG. 13(C)
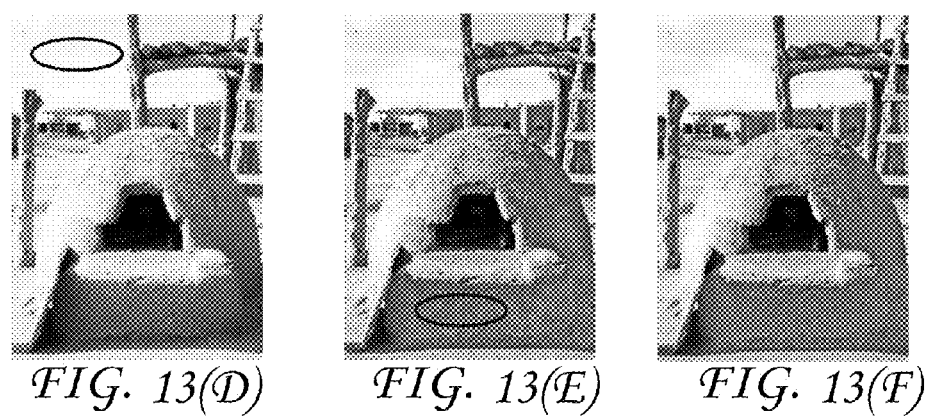
FIG. 13(D)   FIG. 13(E)   FIG. 13(F)

IMAGE FILTERING BASED ON STRUCTURAL INFORMATION

CROSS-REFERENCE TO RELATED APPLICATIONS

This application claims the benefit of priority from International Application No. PCT/CN2012/080299, entitled "Image Filtering Based on Structural Information," filed on Aug. 17, 2012. The teachings of the above-identified PCT application are expressly incorporated herein by reference.

TECHNICAL FIELD

The present invention generally relates to image processing. More particularly, it relates to image filtering.

BACKGROUND OF THE INVENTION

Bilateral filter was first proposed by Tomasi and Manduchi in 1998, Tomasi, C., and Manduchi, R., "*Bilateral filtering for gray and color images*", In Proc. IEEE Int. Conf on Computer Vision, 836-846, 1998 and has been applied to image processing such as denoising, decomposition, stylization, etc. It is an edge-preserving and noise reducing smoothing filter. The intensity value at each pixel in an image is replaced by a weighted average of intensity values from nearby pixels. The weights depend not only on spatial distance but also on the pixel value differences (or range difference), e.g. color intensity. This preserves sharp edges by systematically looping through each pixel and assigning weights to the adjacent pixels accordingly.

For an image $f(\omega)$, bilateral filtering can be described as:

$$h(\omega) = k^{-1}(\omega) \int_{-\infty}^{\infty} \int_{-\infty}^{\infty} f(\xi) c(\xi,\omega) s(f(\xi),f(\omega)) d\xi \quad (1)$$

with the normalization $$k(\omega) = \int_{-\infty}^{\infty} \int_{-\infty}^{\infty} c(\xi,\omega) s(f(\xi),f(\omega)) d\xi \quad (2)$$

where $c(\xi,x)$ measures the geometric closeness between the neighborhood center x and a nearby point $\xi$; and $s(f(\xi),f(x))$ measures the photometric similarity between x and $\xi$.

If invariant Gaussian filtering is employed, the $c(\xi,\omega)$ and $s(f(\xi),f(\omega))$ can be expressed as $$c(\xi, \omega) = e^{-\frac{d(\xi,\omega)^2}{2\sigma_d^2}} \quad (3)$$

$$s(f(\xi), f(\omega)) = e^{-\frac{\delta(f(\xi),f(\omega))^2}{2\sigma_i^2}} \quad (4)$$

where $c(\xi,\omega) = d(\xi-\omega) = \|\xi-\omega\|$ is the Euclidean distance between $\omega$ and $\xi$; and $\delta(a,b) = \delta(a-b) = \|a-b\|$ is a measure of distance between the two intensity values a and b. The parameter $\sigma_d$ controls the influence of the spatial information while the parameter $\sigma_i$ controls the influence of the intensity information.

In general, the bilateral filter and many of its variations are designed based on two observations of natural images:

Neighboring pixels tend to be strongly correlated. This property leads to the design of a spatial filter, i.e. $c(\xi,x)$ which measures the geometric closeness between x and $\xi$.

Pixels with similar pixel values tend to be strongly correlated. This property leads to the design of a range filter, i.e. $s(f(\xi),f(x))$ which measures the photometric similarity between x and $\xi$.

Unfortunately there are scenarios where these observations do not apply. For illustration purposes, a denoising example is provided in FIG. 1. In this figure, several dark dots appear as noise in one pepper of the image. When reconstructing the pixels of the noise contaminated region, the pixels in the dark gap region of the image are given high weights according to the range filter because of the similar pixel values. It is apparent that such a weight assignment is not appropriate. There is a need to build a filter that overcomes this problem. Prior solutions have not adequately been established in the art.

SUMMARY OF THE INVENTION

This invention is directed to a method and an apparatus for image filtering.

According to an aspect of the present invention, there is provided a method for processing an image. The method calculates a first filtering coefficient for a first pixel in the image based on structural information of the image wherein the first filtering coefficient has a continuous value and the structural information comprises edges; determines a property value of a second pixel in the image using said first filtering coefficient and a corresponding property value of said first pixel; and replaces an existing property value of the second pixel with the determined property value.

According to another aspect of the present invention, there is provided an apparatus for processing an image. The apparatus comprises a filtering coefficient generator for generating a first filtering coefficient for a first pixel in the image based on structural information of the image wherein the first filtering coefficient has a continuous value and the structural information comprises edges; and a property value calculator for determining a property value of a second pixel in the image using said first filtering coefficient and a corresponding property value of said first pixel.

BRIEF DESCRIPTION OF THE DRAWINGS

The above features of the present invention will become more apparent by describing in detail exemplary embodiments thereof with reference to the attached drawings in which:

FIG. 1 illustrates a denoising example whereby a prior image filter does not work.

FIG. 2 illustrates the benefit of considering structural information for image filtering: (A) original image; (B) structural illustration of the original image; and (C) an enlarged region of the original image.

FIG. 3 shows a block diagram of an image filtering apparatus according to the principles of the present invention.

FIGS. 7(A) and 7(B) illustrate the edges described by the gradients in various directions.

FIGS. 8(A)-8(E) show pictorial examples of edges used for region correlation evaluation according to the principles of the present invention.

FIG. 9 shows a pictorial example for fast calculation of a strongest edge intersecting with the line connecting two pixels.

FIG. 10 shows experimental results on denoising according to one embodiment of the present invention: FIG. 10(A) results of a prior filter; and FIG. 10(B) the results of the proposed solution.

FIG. 11 illustrates a two-layer decomposition based tone mapping.

FIG. 12 illustrates experimental results on HDR imaging according to one embodiment of the present invention: FIG. 12(A) The results of a prior filter; and FIG. 12(B) the results of the proposed solution.

FIGS. 13(A)-13(F) show experimental results on composition of multi-exposed images.

DETAILED DESCRIPTION

In the present invention, a solution to processing an image is provided. By exploring the structural information of an image, effective and efficient image filtering is achieved. FIG. 2 illustrates the benefits of considering structural information in image filtering. FIG. 2(A) shows an original image. FIG. 2(B) shows the structural information of the original image which is determined by edges. FIG. 2(C) is an enlarged view of the rectangle area in FIG. 2(A). In FIG. 2(C), pixel A denotes a pixel to be restored, called a target pixel; pixel B and C denote two pixels used to reconstruct A, called contributing pixels. Pixels B and C have equal distance to A. As shown in FIG. 2(B), images can be divided into a number of regions which are separated/defined by edges. These regions describe the structure of the image. When determining the filtering coefficients for a given target pixel, it is desirable to give a higher weight to the contributing pixels in the same region as the target pixel than those in a different region. Take FIG. 2(C) as an example, pixel C should be given a higher weight than pixel B during the restoration of pixel A. However, the existing bilateral filter gives the same preference to pixels B and C in this example due to their equal distance to A and similar range values. It is clear from this example that considering structural information when processing/filtering an image brings advantages over filters in the art.

FIG. 3 shows a block diagram of an image filter according to the principles of the present invention. It comprises a filtering coefficient generator 310, and a property value calculator 320. The coefficient generator 310 calculates filtering coefficients for each pixel in Γ based on the structural information of the image, where Γ is a set of supporting pixels in an image I that will be used to restore or construct a property value of a target pixel x in image I. An example of Γ is the set of the pixels in an n×n neighborhood of x. These coefficients are then output to a property value calculator 320 to calculate the property value of x. One embodiment is to use the filtering coefficients as weights to the property value of the corresponding pixels in Γ and the output of the property value calculator would be a weighted sum of the property values of the pixels in Γ. The coefficient generator 310 and the property value calculator 320 apply the same operations to each pixel in the image I and finally output a processed image I' whose pixels have the calculated property values. The processed image I' is generated either by replacing the existing property values of image I with the calculated values for each pixel or by creating a new image and filling in, which is equivalent to replacing its initial value with, the calculated property value for each pixel.

Figure 4:
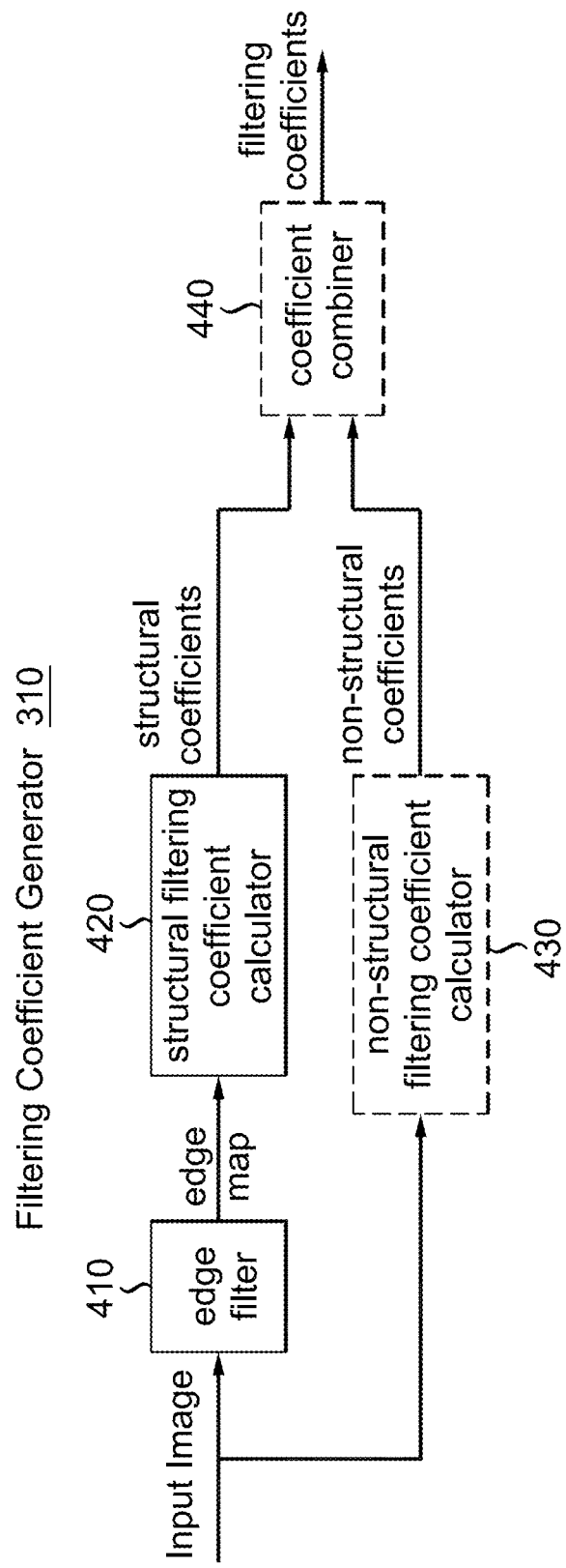
FIG. 4 shows a block diagram of a filtering coefficient generator according to one embodiment of the present invention.

FIG. 4 depicts one embodiment of filtering coefficient generator 310. In this embodiment, an edge filter 410 and a structural filtering coefficient calculator 420 are employed to calculate the filtering coefficients. For an input image I, the edge filter 410 first finds an edge map of image I and structural information is determined based on the edge map. In the present invention, the structural information is represented by the regions that are determined by the edges. The structural filtering coefficients are then calculated by taking into consideration the relationship among regions where the pixels reside. The edge map in this invention includes various edge representations of an image, such as an edge image or a set of edge images such as the set of gradient images as discussed later.

Figure 5:
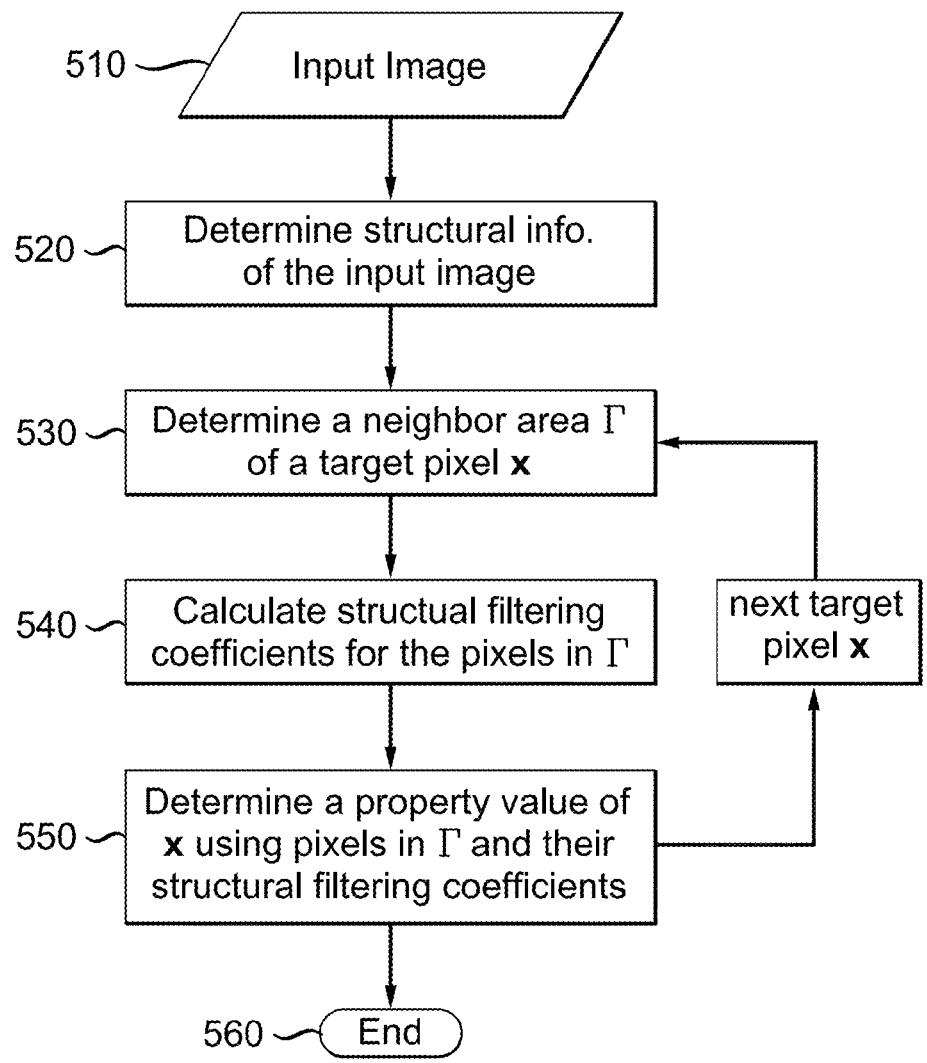
FIG. 5 shows an example flow chart of the process for filtering an image according to one embodiment of the present invention.

FIG. 5 shows a flowchart for processing an input image to obtain property values for the image pixels. Step 520 takes the input image 510 and determines its structural information. In the present invention, such structural information is represented using regions determined by an edge map of the input image 510. Step 530 then picks a target pixel x to be processed in image 510 and determines an area Γ. As mentioned before, Γ is a set of supporting pixels in an image that will be used to restore or construct a property value of the target pixel x in the input image. An example of Γ is the set of the pixels in an n×n neighborhood of x. In step 540, structural filtering coefficients are calculated for each pixel in F. Using the calculated structural filtering coefficients and the property values of pixels in F, a new property value for pixel x is calculated in step 550. Steps 530 to 550 are repeated for each target pixel that needs to be processed. The process ends at step 560 when the new property values for all the target pixels are calculated. An image with the new property values for each pixel is then output. The property values can be the pixel values for each pixel, such as a grey-scale value for a grey image or color values for a color image. The property can also be other properties such as a depth value for a pixel.

To take account of the structural information into the filter design, a quantitative parameter needs to be defined to indicate the possibility of two pixels being in the same regions, known as the region correlation of two pixels. In a preferred embodiment, the region correlation, which has a continuous value, is selected as the filtering coefficient. To obtain the region correlation, structural information needs to be first identified. Specifically, in the present invention, an edge map of the image, generated in edge filter 410, is employed to identify regions in the image. In one embodiment, four gradient images are employed as the edge map, including horizontal, vertical, diagonal, and off-diagonal gradient images, denoted as $(\nabla_{left}I, \nabla_{up}I, \nabla_{left-up}I, \nabla_{right-up}I)$. The four gradient images can be computed as follows:

$$\nabla_{left}I(x,y)=I(x,y)-I(x-1,y) \quad (5)$$

$$\nabla_{up}I(x,y)=I(x,y)-I(x,y-1) \quad (6)$$

$$\nabla_{left-up}I(x,y)=I(x,y)-I(x-1,y-1) \quad (7)$$

$$\nabla_{right-up}I(x,y)=I(x,y)-I(x+1,y-1) \quad (8)$$

where I(x,y) is the pixel value at the coordinate (x,y) of the image. As shown in FIG. 7(A), the edge $e_k$, which cut the line between the pixels $O_k$ and $N_k$, is denoted by dash lines and located at the center of the closest neighbors $O_k$ and $N_k$; its length equals their distance $\|O_k N_k\|$ and its strength is the gradient $\|I(O_k)-I(N_k)\|$. Based on the present invention, those skilled in the art would immediately recognize that using gradient images defined symmetrically to those defined in Eqn. (5)-(8) would lead to similar results, i.e. $(\nabla_{right}I, \nabla_{down}I, \nabla_{left-down}I, \nabla_{right-down})$ formulated as $$\nabla_{right}I(x,y)=I(x,y)-I(x+1,y)$$

$$\nabla_{down}I(x,y)=I(x,y)-I(x,y+1)$$

$$\nabla_{left-down}I(x,y)=I(x,y)-I(x-1,y+1)$$

$$\nabla_{right-down}I(x,y)=I(x,y)-I(x+1,y+1)$$

In a different embodiment, more gradient images along other directions can be used. One example of such a gradient direction is shown in FIG. 7(B) with edge $e_5$, and formulated as follows:

$$\nabla_{right2-up1}I(x,y)=I(x,y)-I(x+2,y-1) \quad (9)$$

Certainly, fewer gradient directions may also be used to describe the structural information, such as using only horizontal and vertical gradients. In general, using more gradient directions allows edges along various directions to be identified more accurately, while a higher computational cost may be incurred.

To measure the region correlation of a pair of pixels, and thus the filtering coefficient, a path is defined between the two pixels to be examined. Such a path can be a path from one pixel to the other following 8-neighborhood connectivity, or a straight line connecting the two pixels, or a combination thereof. Taking the straight line as an example, the region correlation $g(\xi, x)$ between a pair of pixels $(\xi, x)$ can be defined as a function of the edges that are cut by or intersect with the straight line. FIGS. 8(A)-8(E) illustrates five different scenarios of a pixel pair and the edges cut by the line connecting them. For example, FIG. 8(C) illustrates the situation for pixel pair $(O_8, N_8)$, whereby the line connecting $O_8$ and $N_8$ intersects with five edges $e_6, e_7, e_8, e_9$ and $e_{10}$. In one embodiment, $g(\xi,x)$ is chosen as a measurement of the probability of x and being in the same region and it takes the following form.

$$g(\xi, x) = \exp\left(-\frac{r_{\xi x}^2}{2\sigma_r^2}\right), \quad (10)$$

where $r_{\xi x}$ denotes the highest edge strength among the edges that intersect with the line connecting $\xi$ and x. $\sigma_r$ is a parameter controlling the shape of the function $g(\xi, x)$ and thereby controlling the influence of the region correlation to the filtering process of the input image. Mathematically, $r_{\xi x}$ can be formulated by:

$$r_{\xi x}=\max(\nabla f(\Omega_{\xi,x})), \quad (11)$$

where $\nabla f$ denotes the gradient map of the image $f(x)$, and $\Omega_{\xi,x}$ denotes the set of coordinates for the edges intersecting with the line between $\xi$ and x. Then $r_{\xi x}$ is the strength of the sharpest edge in $\Omega_{\xi,x}$. In the example in FIG. 8(C), $r_{O_8N_8}=\max(e_{6\text{-}10})$. Note that in general, $g(\xi,x)$ can be any form as a decreasing function of $r_{\xi x}$.

With the calculated filtering coefficients $g(\xi,x)$, the output image $h(x)$ in response to an input image $f(x)$, can be calculated by $$h(x)=(x)\int_{\Gamma(x)} f(\xi)g(f,x)d\xi, \quad (12)$$

where $k(x)=\int_{\Gamma(x)}g(\xi,x)d\xi$, and $\Gamma(x)$ denotes the supporting area in the image whose pixels are used for calculating the output value $h(x)$ for target pixel x. Written in discrete form, Eqn. (12) becomes $$I'(i,j) = \frac{1}{\sum_{(p,q)\in r_{(i,j)}} G(p,q)} \sum_{(p,q)\in r_{(i,j)}} G(p,q)I(p,q), \quad (13)$$

where I is the input image and I' is the output image; $G(p,q)$ is the value of g $(\xi,x)$ at coordinate (p,q); and $\Gamma_{(i,j)}$ is the set of supporting pixels that are used for calculating the output value for pixel (i,j) of image I. As mentioned elsewhere in this application, an example of $\Gamma_{(i,j)}$ is the set of the pixels in an n×n neighborhood of pixel (i,j).

In one implementation, the process of finding the edge having the highest strength, i.e. the strongest edge $r_{fx}$, shown in Eqn. (11) is performed through a look up table. For example, for a given neighbor size n, all the representative scenarios of the edges intersecting with the straight line connecting a pair of pixels $(\xi,x)$ in an n×n neighborhood is listed beforehand. These representative scenarios can be described using the representative edge set $\Omega_{\xi,x}$. Other scenarios can be simply derived from these representative scenarios, such as by taking its symmetrical form along the horizontal or vertical axis. During the calculation of $r_{\xi x}$, the corresponding $\Omega_{\xi,x}$ is retrieved or derived from the list. For example, FIG. 8 shows all five representative edge-cutting scenarios for a 7×7 neighborhood filtering. In this way, the precise calculation of $\Omega_{\xi, x}$ and $r_{\xi x}$ can be obtained.

To speed up the process, a fast algorithm for calculating the $r_{\xi x}$ may be employed. One embodiment of the fast algorithm is based on the idea that a path connecting $\xi$ and x may be decomposed into or approximated by two lines: one line connecting $\xi$ to $\xi_1$ and one connecting $\xi_1$ to x, and $r_{\xi \xi_1}$ has been previous calculated. Then $r_{\xi x}$ can be calculated by $$r_{\xi x}=\max(r_{\xi\xi_1},\|\xi_1-x\|). \quad (14)$$

$r_{\xi\xi_1}$ can be further decomposed and calculated in a similar way to further speed up the process. FIG. 9 illustrates the fast algorithm using a simple example. In FIG. 9, $e_1=\|O_1-O_2\|$; $e_2=\|O_2-O_3\|$; $e_3=\|O_3-O_4\|$; $e_4=\|O_4-O_5\|$. Then, $r_{O_1O_2}=e_1$; $r_{O_1O_3}=\max(e_1,e_2)$; $r_{O_1O_4}=\max(e_1,e_2,e_3)$. By using the fast algorithm, $r_{O_1O_4}$ can be calculated as $r_{O_1O_4}=\max(e_1,e_2,e_3)=\max(r_{O_1O_3}, e_3)$, which reduces the number of comparisons from 2 to 1. Similarly, $r_{O_1O_5}$ can be calculated as $r_{O_1O_5}=\max(e_1,e_2,e_3,e_4)=\max(r_{O_1O_4}, e_4)$. In this way, the computational complexity may be significantly reduced.

Apart from the gradient images, other edge maps, such as a Sobel edge map, that do not have gradient images can also be used to generate the structural filtering coefficient in a different embodiment. In this case, $r_{\xi x}$ can be calculated as $$r_{\xi x}=\max(E(\Omega'_{\xi,x})), \quad (15)$$

where $E(x)$ denotes the edge map of image $f(x)$, and $\Omega'_{\xi,x}$ denotes the set of coordinates of $E(x)$ intersecting with the line between $\xi$ and x. If the $\Omega'_{\xi,x}$ contains sub-pixel coordinates, $E(x)$ at the corresponding sub-pixel coordinates may be calculated by interpolation using neighboring values, or by using the nearest value in $E(x)$ as an approximation for fast calculation.

Figure 6:
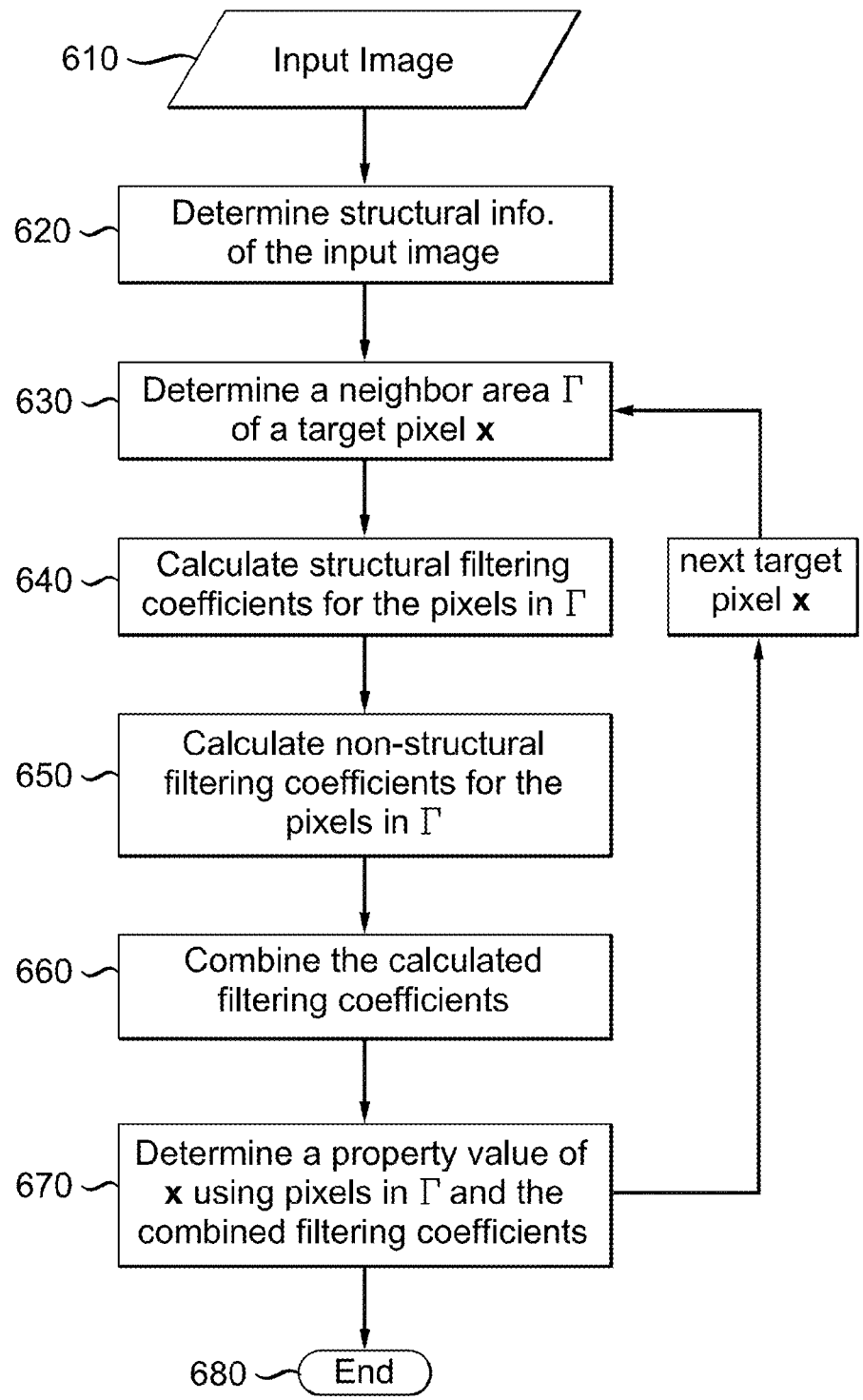
FIG. 6 shows an example flow chart of the process for filtering an image according to another embodiment of the present invention.

In a different embodiment of the present invention, the structural information can be combined with other non-structural information, such as range/intensity values and spatial information, to process/filter an image. In this embodiment, the filtering coefficient generator 310 further comprises a non-structural filtering coefficient calculator 430 to calculate the non-structural coefficient and a coefficient combiner 440 to combine the calculated structural and non-structural coefficients. In this case, the property value of the target pixel x in image I may be computed using the combined coefficient and the corresponding property values of the supporting pixels in $\Gamma$. FIG. 6 illustrates the flow chart of the image filtering/processing using the combined filtering coefficients. Steps 620-640 are similar to steps 520-540 in FIG. 5. At step 650, non-structural filtering coefficients are calculated for each pixel in Γ. These coefficients are then combined in step 660 with the structural filtering coefficients to generate the final filtering coefficients, which are used in step 670 for the calculation of the property values for pixel x. Steps 630 to 670 are repeated for each target pixel that needs to be processed.

In a preferred embodiment, the structural information, i.e. the regional correlation is combined with spatial and intensity information for image filtering. The combined spatial, intensity and region correlation based filter, called the Spatial-Intensity-Region (SIR) filter, tends to smooth within a flat neighborhood rather than across strong edges. The SIR filter integrates the region correlation factor into the joint filter mechanism. Its response for an input image f(x) can be calculated by $$h(x) = k^{-1}(x) \int_{\Gamma(x)} f(\xi) c(\xi, x) s(f(\xi), f(x)) g(\xi, x) d\xi$$

$$k(x) = \int_{\Gamma(x)} c(\xi, x) s(f(\xi), f(x)) g(\xi, x) d\xi, \quad (16)$$

where $c(\xi, x)$ and $s(f(\xi), f(x))$ measure the spatial closeness and the intensity (e.g., color) similarity between the target pixel x and a supporting point $\xi$; as disclosed before, $g(\xi, x)$, measures the probability of x and $\xi$ being in the same region. Typically, $c(\xi, x)$ and $s(f(\xi), f(x))$ are Gaussian functions of the Euclidean distance between their arguments, i.e.

$$c(\xi, x) = \exp\left(-\frac{\|\xi - x\|^2}{2\sigma_d^2}\right), \quad (17)$$

$$s(f(\xi), f(x)) = \exp\left(-\frac{\|f(\xi) - f(x)\|^2}{2\sigma_i^2}\right). \quad (18)$$

The region weight $g(\xi, x)$ is computed according to Eqn. (10). Like the parameters $\sigma_d$ and $\sigma_i$ which control the influence of the spatial and intensity information, $\sigma_r$ controls the influence of the region correlation.

The SIR filter finds its value in a wide range of applications, such as image denoising, tone mapping, and exposure fusion.

Denoising

To demonstrate the advantages of using the structural information in image filtering, the bilateral filter and the SIR filter are used to denoise an impaired image womanhat shown in FIG. 10. To restore the impaired image, the SIR filter is applied iteratively to process the pixels within a sliding window. The newly calculated pixel values can be used to replace the existing values immediately or held until all the pixels are processed when the calculated pixel values are updated all together. Denoting the size of the sliding window as (2n+1)×(2n+1) and the image size as m×m, the filtering process for a pixel I(x, y) is implemented as follows:

a) Calculate the spatial closeness for each neighbor pixel I(i,j) in the window as:

$$C(i,j) = e^{-[(x-i)^2 + (y-j)^2]/2\sigma_d^2}; \quad (19)$$

b) Calculate the range/intensity similarity for each neighbor pixel I(i,j) in the window as:

$$S(i,j) = e^{-[I(x,y) - I(i,j)]^2/2\sigma_i^2}; \quad (20)$$

c) Calculate the region correlation for each neighbor pixel I(i,j) in the window as:

$$G(i,j) = e^{-\{r[(i,j),(x,y)]\}^2/2\sigma_r^2}; \quad (21)$$

d) The filtering coefficients for each neighbor is calculated by:

$$F(i, j) = C(i, j)S(i, j)G(i, j) \Big/ \sum_{\substack{|p-x| \le n, |q-y| \le n \\ p \le m, q \le m}} C(p, q)S(p, q)G(p, q); \quad (22)$$

e) The output of the filter is:

$$I'(x, y) = \sum_{\substack{|p-x| \le n, |q-y| \le n \\ p \le m, q \le m}} F(p, q)I(p, q). \quad (23)$$

The same process can be employed for other applications other than denoising. As can be seen from FIGS. 10(A) and 10(B), SIR filter performs significantly better in preserving the textures and edges than the bilateral filter, which suggests the advantage of the consideration of region correlation/structural information in the filter design.

Tone Mapping

Tone mapping is a technique to map a set of colors to another set in order to display High Dynamic Range (HDR) images on low dynamic range devices. If the contrast is reduced with uniform intensity, the small-contrast detail will become invisible. A popular solution is to decompose an HDR image into different layers (e.g., structure and detail), reduce their contrast with different intensity, and recompose the image with the contrast-reduced layers. FIG. 11 illustrates a two-layer decomposition based tone mapping, where the base layer is computed by a smoothing filter and the detail layer is the difference between the base layer and the input. The contrast reduction is only performed on the base layer, and thus the contrast of the detail is preserved after the reconstruction.

The bilateral filter is a natural choice for the smoothing filter. However, sometimes the bilateral filter cannot completely extract the structure of the image and thus damages some important details or over-exposes the edges. Given that the SIR filter works more effectively in separating the detail and the structure, it is expected that the employment of the SIR filter will provide better appearance of tone mapped images. As confirmed in FIGS. 12, and 12(A)-12(B), tone mapping with bilateral filter generates undesired halo-like artifact along all the edges of the image while the proposed approach produces a more realistic look of the image.

Exposure Fusion

Exposure fusion is an efficient technique of compositing multiple exposed images in order to capture the entire dynamic range of the scene in a single image. The task can also be completed by HDR Imaging, which relies on a few techniques such as camera response function estimation and tone mapping. In comparison, exposure fusion simply calculates the weighted mean of the differently exposed images at each pixel. Three quality measures, namely, contrast, saturation and well exposedness, are defined in Mertens, T., Kautz, J., and Reeth, F. V., "*Exposure fusion*", In Proceedings of Pacific Graphics, 15-22, 2007, to guide a multi-scale fusion process. It is proposed in Raman, S., and Chaudhuri, S. "*Bilateral filter based compositing for variable exposure photography*", In Short Papers, Eurographics, 1-4, 2009 to employ bilateral decomposition for the contrast measurement, which alleviates the degradation at the edges. Following the framework of Mertens et al. the proposed SIR filter further protects the edges, and smoothes the weight map to suppress the unexpected color transitions. The determination of the weight map $W_k$ for each input image $I_k$ is performed as follows:

$$W_k(i, j) = \frac{C_k(i, j)S_k(i, j)E_k(i, j)}{\Sigma_m C_m(i, j)S_m(i, j)E_m(i, j)} \quad (24)$$

where (i, j) denotes the coordinate of a pixel. The contrast factor $C_k$ is calculated by the absolute value of the difference between its original value $I_k(i,j)$ and the SIR filtered version $J_k(i,j)$: $C_k(i,j)=|I_k(i,j)-J_k(i,j)|$. The saturation factor $S_k$ is calculated by the standard deviation within the R, G and B channel at each pixel; and the well-exposedness $E_k$ is calculated by a Gaussian function of the difference between its intensity value and 0.5. $W_k(i, j)$ is then smoothed with a median filter and finally used to compute the exposure fused image F as $$F(i, j) = \frac{(p + W_k(i, j))I_k(i, j)}{\Sigma_m(p + W_k(i, j))} \quad (25)$$

Experimental results are provided in FIG. 13, whereby FIGS. 13(A), (B) and (D), (E) show the results by using the solutions in the art, while FIGS. 13(C), (F) show the results of the proposed solution by the present invention. Areas where significant improvements can be observed are marked with circles. As can be seen, the approach in the art generates some unexpected spots because of the extreme discontinuity in the weight map. If such discontinuity occurs in the flat regions of the input images, these unpleasant color transitions are generated. A large constant p was used in the art to suppress such artifacts, which reduces the contrast of the real edges at the same time. The proposed approach, however, is capable of both preserving the under-/over-exposed content and suppressing the unpleasant color transitions.

The filter described above can also be used in other various signal processing applications such as post/in-loop filter for image/video compression, etc.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

Although preferred embodiments of the present invention have been described in detail herein, it is to be understood that this invention is not limited to these embodiments, and that other modifications and variations may be effected by one skilled in the art without departing from the scope of the invention as defined by the appended claims.

The invention claimed is:

1. A method for processing an image performed by an apparatus comprising at least one processor, said method comprising
   calculating by a processor a first filtering coefficient for a first pixel in the image based on structural information of the image wherein the first filtering coefficient has a continuous value and the structural information comprises edges in the image;
   determining by a processor a property value of a second pixel in the image using at least said first filtering coefficient and a corresponding property value of said first pixel; and
   generating a processed image by a processor by replacing an existing property value of the second pixel in the image with the determined property value.

2. The method of claim 1, wherein the first filtering coefficient is calculated by evaluating the probability of the first pixel and the second pixel being in a same region in the image, said regions being determined by the edges in the structural information.

3. The method of claim 1, wherein said calculating the first filtering coefficient step comprises:
   identifying an edge map of the image; and
   measuring a region correlation between the first and the second pixels using the identified edge map, said region correlation is used as the first filtering coefficient.

4. The method of claim 3, wherein the measuring step comprises:
   defining a path $\Omega_{\xi,x}$ between said first and second pixels;
   finding the set of edges that intersect with the path $\Omega_{\xi,x}$; and
   calculating the region correlation as a decreasing function of $r_{\xi,x}$, wherein x represents the first pixel and $\xi$ represents the second pixel; $r_{\xi,x}$ denotes the highest edge strength among $\Omega_{\xi,x}$.

5. The method of claim 4, wherein said path is a straight line between said first and second pixels.

6. The method of claim 1, prior to the replacing step, further comprising:
   calculating by a processor a second filtering coefficient for the first pixel based on non-structural information of the image; and
   wherein determining said property value of the second pixel also uses said second filtering coefficient of said first pixel.

7. The method of claim 6, wherein said non-structural information comprises at least one of spatial information and range information.

8. The method of claim 1, wherein the edges are identified using at least one directional gradient image.

9. The method of claim 1, wherein the edges are identified using non-directional edge filter.

10. The method of claim 1, wherein said property value comprises at least one of a pixel value and a depth value.

11. An apparatus for processing an image, comprising at least one processor, a random access memory and an input/output interface, said processor being configured to:
    generate in a filtering coefficient generator a first filtering coefficient for a first pixel in the image based on structural information of the image wherein the first filtering coefficient has a continuous value and the structural information comprises edges in the image;
    determine in a property value calculator a property value of a second pixel in the image using at least said first filtering coefficient and a corresponding property value of said first pixel; and generate a processed image in a property value calculator by replacing an existing property value of the second pixel in the image with the determined property value.

12. The apparatus of claim 11, wherein said processor is configured to calculate in the filtering coefficient generator the first filtering coefficient by being configured to evaluate the probability of the first pixel and the second pixel being in a same region in the image, said regions being determined by the edges in the structural information.

13. The apparatus of claim 11, wherein said processor is configured to calculate in the filtering coefficient generator by being configured to:
   identify in an edge filter an edge map of the image; and
   calculate in a structural filtering coefficient calculator the first filtering coefficient by measuring a region correlation between the first and the second pixels using the identified edge map.

14. The apparatus of claim 13, wherein said processor is configured to measure the region correlation in the structural filtering coefficient calculator by being configured to:
   define a path $\Omega_{\xi,x}$ between said first and second pixels;
   find the set of edges that intersect with the path $\Omega_{\xi,x}$; and
   calculate the region correlation as a decreasing function of $r_{\xi,x}$, wherein x represents the first pixel and $\xi$ represents the second pixel; $r_{\xi,x}$ denotes the highest edge strength among $\Omega_{\xi,x}$.

15. The apparatus of claim 13, wherein said path is a straight line between said first and second pixels.

16. The apparatus of claim 13, wherein the edge filter is a directional gradient edge filter.

17. The apparatus of claim 13, wherein the edge filter is a non-directional edge filter.

18. The apparatus of claim 11, wherein said processor is further configured to:
   calculate in a non-structural coefficient calculator a second filtering coefficient for the first pixel based on non-structural information of the image; and
   wherein said property value calculator determines said property value of the second pixel also using said second filtering coefficients of said first pixel.

19. The apparatus of claim 18, wherein said non-structural information comprises at least one of spatial information and range information.

20. The apparatus of claim 11, wherein said property value comprises at least one of a pixel value and a depth value.

* * * * *